(12) United States Patent
Upadhyaya et al.

(10) Patent No.: US 11,650,973 B2
(45) Date of Patent: *May 16, 2023

(54) CONCURRENT MULTIPLE HIERARCHICAL DATA STRUCTURES WITH CONSISTENT DATA

(71) Applicant: Oracle International Corporation, Redwood Shores, CA (US)

(72) Inventors: Anadi Upadhyaya, Belmont, CA (US); Ty Hayden, Grand Junction, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 16/889,069

(22) Filed: Jun. 1, 2020

(65) Prior Publication Data
US 2020/0293513 A1 Sep. 17, 2020

Related U.S. Application Data

(63) Continuation of application No. 14/500,696, filed on Sep. 29, 2014, now Pat. No. 10,671,595.

(51) Int. Cl.
*G06F 16/23* (2019.01)
(52) U.S. Cl.
CPC ............... *G06F 16/2365* (2019.01)
(58) Field of Classification Search
CPC .................................... G06F 16/2365
USPC ...................................... 707/694
See application file for complete search history.

(56) References Cited

U.S. PATENT DOCUMENTS

| 7,251,666 | B2 | 7/2007 | Morinville | |
| 7,447,709 | B1* | 11/2008 | Rozenman | .......... G06F 16/2443 |
| 7,606,811 | B1* | 10/2009 | Rozenman | .............. G06F 16/27 |
| 8,538,781 | B2 | 9/2013 | Richardson et al. | |
| 8,571,927 | B2 | 10/2013 | Tyler et al. | |
| 2007/0156767 | A1* | 7/2007 | Hoang | ................... G06Q 10/06 |
| 2009/0182570 | A1 | 7/2009 | Morinville | |
| 2009/0182607 | A1 | 7/2009 | Morinville | |
| 2009/0204448 | A1 | 8/2009 | Kaehler et al. | |

(Continued)

OTHER PUBLICATIONS

"Building Tomorrow's Organizations Today, Performance Cloud", Employee Performance Management Software for Global Business, Available Online at: http://www.cornerstoneondemand.com/global-business/talent-management/performance-management-cloud. Accessed from Internet on Dec. 27, 2013, 7 pages.

(Continued)

*Primary Examiner* — Hosain T Alam
*Assistant Examiner* — Nicholas E Allen
(74) *Attorney, Agent, or Firm* — Kilpatrick Townsend & Stockton LLP

(57) ABSTRACT

A method may include maintaining first data structure with records organized in a first hierarchy, and maintaining a second data structure with records organized in a second hierarchy. The method may additionally include receiving a change request for the value stored in the first record. The change request may be received from a parent in the second data structure of the first record. The method may further include sending a notification to the parent in the first data structure that the parent in the second data structure is attempting to change the first record.

20 Claims, 14 Drawing Sheets

(56) References Cited

U.S. PATENT DOCUMENTS

| | | |
|---|---|---|
| 2009/0254400 A1 | 10/2009 | Lillie |
| 2010/0100427 A1 | 4/2010 | McKeown et al. |
| 2010/0185593 A1 | 7/2010 | Wong et al. |
| 2012/0053952 A1 | 3/2012 | Upadhyaya et al. |
| 2012/0084325 A1 | 4/2012 | Bansode et al. |
| 2012/0102026 A1 | 4/2012 | Fortune |
| 2012/0323811 A1* | 12/2012 | McKeown ........... G06Q 10/103 705/320 |
| 2013/0002676 A1* | 1/2013 | Ziemann ................ G06T 11/20 345/440 |
| 2013/0036348 A1 | 2/2013 | Hazard |
| 2013/0144677 A1 | 6/2013 | Tuggle |
| 2014/0032664 A1 | 1/2014 | Wookey |
| 2014/0053110 A1 | 2/2014 | Brown et al. |
| 2014/0278705 A1 | 9/2014 | Tuggle |
| 2014/0280385 A1* | 9/2014 | Prouty ................. G06F 16/282 707/812 |

OTHER PUBLICATIONS

"Compensation Viewer", FlowJo—Version 7.6.4 Manual—Compensation Tool, Available Online at: http://www.flowjo.com/v764/en/compgui.html, Accessed from Internet on Dec. 24, 2013, 2 pages.

"EmPerform Employee Performance and Talent Management Software", Pay-for-Performance, Available Online at: http://www.employee-performance.com/compensation_management.html, Accessed from Internet on Dec. 27, 2013, 3 pages.

"Managing an Organization's Biggest Cost: The Workforce", Human Capital Management Institute, Human Concepts, Available Online at: http://www.hcminst.com/files/OrgPlusTotalCostWorkforce.pdf, 9 pages.

"Siebel Incentive Compensation Management Configuration Guide", Siebel 7, eBusiness, Version 7.5.3, Available Online at: http://docs.oracle.com/cd/E05581_01/books/IncCompSetup.pdf, Dec. 2003, 182 pages.

"VUE Software to Provide Compensation Management System with Revenue Reconciliation for Insurance Technology and Distribution Organization", PR Newswire, Available Online at: http://www.prnewswire.com/news-releases/vue-software-to-provide-compensation-management-system-with-revenue-reconciliation-for-insurance-technology-and-distribution-organization-214648541.html, Jul. 8, 2013, 2 pages.

Chan, "The New Horizon for Online Compensation Planning Tools, Success Factors, Benefits & Compensation Solutions", Available Online at: https://www.successfactors.com/en_us/lp/articles/compensation-planning-software.html, Mar.-Apr. 2007, 2 pages.

Coleman, "Review of Compensation Schemes and Enterprise Compensation Management Systems", Enterprise Compensation Management Systems, University of Wollongon, SBS TBS906, Information Systems for Managers, Oct. 2009, 37 pages.

U.S. Appl. No. 14/500,696, Advisory Action dated Jan. 18, 2019, 6 pages.

U.S. Appl. No. 14/500,696, Final Office Action dated Oct. 5, 2017, 30 pages.

U.S. Appl. No. 14/500,696, Final Office Action dated Oct. 17, 2018, 35 pages.

U S U.S. Appl. No. 14/500,696, Non-Final Office Action dated Aug. 12, 2016, 28 pages.

U S U.S. Appl. No. 14/500,696, Non-Final Office Action dated Mar. 23, 2017, 29 pages.

U S U.S. Appl. No. 14/500,696, Non-Final Office Action dated Jun. 25, 2019, 33 pages.

U S U.S. Appl. No. 14/500,696, Non-Final Office Action dated Mar. 12, 2018, 35 pages.

U S U.S. Appl. No. 14/500,696, Notice of Allowance dated Jan. 29, 2020, 9 pages.

* cited by examiner

○ Configure Hierarchies

AU Global Compensation Master Plan    [Back] [Next] [Save] [Save and Close] [Cancel]

Primary Hierarchy
The primary hierarchy represents overall ownership of the compensation process and is used for compensation allocations, budgeting, modeling, and approvals.

*Source: [Primary Manager Hierarchy ▶] — 702
When Manager Not Found: [Leave Blank ▶] — 704
Record Missing Relationships in Batch Log Files: ✓ — 706
Default Access Level: [Updates Allowed ▶] — 708
Deafult Access Level Formula: [▶] — 710

Secondary Hierarchy
The secondary hierarchy allows for dotted-line managers to have visibility for employees on their worksheet. They are not subject to a budget and do not have approval authority.

*Source: [Other Manager Hierarchy ▶]
*Hierarchy Determination Formula: [Project Manager ▶]
When Manager Not Found: [Leave Blank ▶]
Record Missing Relationships in Batch Log Files: ✓
Default Access Level: [▶]
Deafult Access Level Formula: [VPs can Update, OTW read-only ▶]

Configure Hierarchies

AU Global Compensation Master Plan

[Back] [Next] [Save] [Save and Close] [Cancel]

Reviewers

These have responsibility for reviewing the allocations across different groups of workers. Reviewers only have visibility to those having a direct relationship. They are not subject to a budget and do not have approval authority.

*Source: Formula ▶

*Hierarchy Determination Formula: Geo Review Manager ▶

When Manager Not Found: Leave Blank ▶

Record Missing Relationships in Batch Log Files: ✓

Default Access Level: No Updates Allowed ▶

Deafult Access Level Formula: ▶

○ Configure Hierarchies

Employee: Anadi Hamm   Cycle: 2014 Review

Primary Manager:
- Name: Fitzimmons, Ty   ☐ Do not refresh
- Hierarchy: Anadi Hamm→Ty Fitzimmons→Rob Strauss
- Last Update Date: 11/18/2013 06:06
- Last Update By: System

Secondary Manager:
- Name: Smith, Clive   ☐ Do not refresh
- Hierarchy: Anadi Hamm→Clive Smith→Steve James
- Last Update Date: 11/21/2013 14:35
- Last Update By: Cindy Admin

Other Reviewer:
- Name: Jones, Jody   ☐ Do not refresh
- Last Update Date: 11/21/2013 14:36
- Last Update By: Cindy Admin

Manager Status:
- Access as Primary Manager: Updates Allowed ▶
- Access as Secondary Manager: No Updates Allowed ▶
- Access as Other Reviewer: No Access ▶

Refresh Data   Save   Save and Close   Cancel

Action History

FIG. 9

Configure Hierarchies

Employee: Anadi Hamm

Reassign Subordinates:

Number of Direct Subordinates: 8

● Do not reassign subordinates
○ Reassign subordinates to manager one level up ~ Meg Fitzimmons

Notification:

To Ty Fitzimmons
☐ Send notification for worker addition

Comments:

To Krish Chouhan
☐ Send notification for worker removal

Comments:

[ Save ]   [ Cancel ]

FIG. 10

CONCURRENT MULTIPLE HIERARCHICAL DATA STRUCTURES WITH CONSISTENT DATA

CROSS-REFERENCE TO RELATED APPLICATION

This application is a continuation U.S. patent application Ser. No. 14/500,696 entitled "Concurrent Multiple Hierarchical Data Structures With Consistent Data", filed on Sep. 29, 2014, which is hereby incorporated by reference in its entirety for all purposes.

BACKGROUND

A data structure represents a particular way of organizing data in a computer. Particular data structures can be designed or organized so that data can be used more efficiently. Depending on the type of application, different kinds of data structures can be highly specialized for specific applications. Data structures also provide a way to manage large amounts of structured data efficiently. For example, databases can be used to store large amounts of data and can interface with efficient algorithms for accessing and manipulating data. Some data structures can be hierarchical in nature such that data elements are represented by parent-child relationships.

BRIEF SUMMARY

In one embodiment, a method of representing records in a plurality of hierarchical data structures may be presented. The method may include maintaining a first data structure including a plurality of records, the plurality of records being organized in a first hierarchy of parent-child relationships in the first data structure. The method may also include maintaining a second data structure comprising the plurality of records, the plurality of records being organized in a second hierarchy of parent-child relationships in the second data structure. The method may additionally include receiving a first change request for a value stored in a first record in the plurality of records, the first change request being received from a parent in the first data structure of the first record. The method may further include changing the first value according to the first change request, and receiving a second change request for the value stored in the first record, the second change request being received from a parent in the second data structure of the first record. The method may also include sending a notification to the parent in the first data structure that the parent in the second data structure is attempting to change the first record.

In another embodiment, a non-transitory computer-readable medium may be presented. The computer-readable memory may comprise a sequence of instructions which, when executed by one or more processors, causes the one or more processors to perform instructions including maintaining a first data structure comprising a plurality of records, the plurality of records being organized in a first hierarchy of parent-child relationships in the first data structure. The operations may also include maintaining a second data structure comprising the plurality of records, the plurality of records being organized in a second hierarchy of parent-child relationships in the second data structure. The operations may additionally include receiving a first change request for a value stored in a first record in the plurality of records, the first change request being received from a parent in the first data structure of the first record. The operations may further include changing the first value according to the first change request, and receiving a second change request for the value stored in the first record, the second change request being received from a parent in the second data structure of the first record. The operations may also include sending a notification to the parent in the first data structure that the parent in the second data structure is attempting to change the first record.

In yet another embodiment, a system may be presented. The system may include one or more processors and a memory communicatively coupled with and readable by the one or more processors. The memory may comprise a sequence of instructions which, when executed by the one or more processors, cause the one or more processors to perform instructions including maintaining a first data structure comprising a plurality of records, the plurality of records being organized in a first hierarchy of parent-child relationships in the first data structure. The operations may also include maintaining a second data structure comprising the plurality of records, the plurality of records being organized in a second hierarchy of parent-child relationships in the second data structure. The operations may additionally include receiving a first change request for a value stored in a first record in the plurality of records, the first change request being received from a parent in the first data structure of the first record. The operations may further include changing the first value according to the first change request, and receiving a second change request for the value stored in the first record, the second change request being received from a parent in the second data structure of the first record. The operations may also include sending a notification to the parent in the first data structure that the parent in the second data structure is attempting to change the first record.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 7 illustrates an interface for defining multiple hierarchies, according to some embodiments.

FIG. 8 illustrates an interface for defining multiple hierarchies, according to some embodiments.

FIG. 9 illustrates an interface for exploring multiple hierarchies through a single record, according to some embodiments.

FIG. 10 illustrates an interface for rearranging multiple hierarchies, according to some embodiments.

DETAILED DESCRIPTION

Described herein, are embodiments for maintaining multiple hierarchies that involve the same group of data records. Typically, data records are organized in a single hierarchy, such as a binary tree, a list, an array, and/or the like. However, some data systems may benefit from dealing with the same group of records in different hierarchal situations. Changing values in each of the data records may often be precipitated in a top-down manner where changes to a child record are executed by a parent record. The embodiments described herein present methods and systems for organizing a plurality of records into a plurality of different concurrent, hierarchical structures. Changes can be propagated down through a first hierarchy while possibly affecting a second hierarchy. Some embodiments may also implement at least a third hierarchical organization with the data records. Operational rules can be established to determine how changes in one hierarchy are propagated, approved, denied, and/or reviewed by any of the other concurrent hierarchies.

Figure 1:
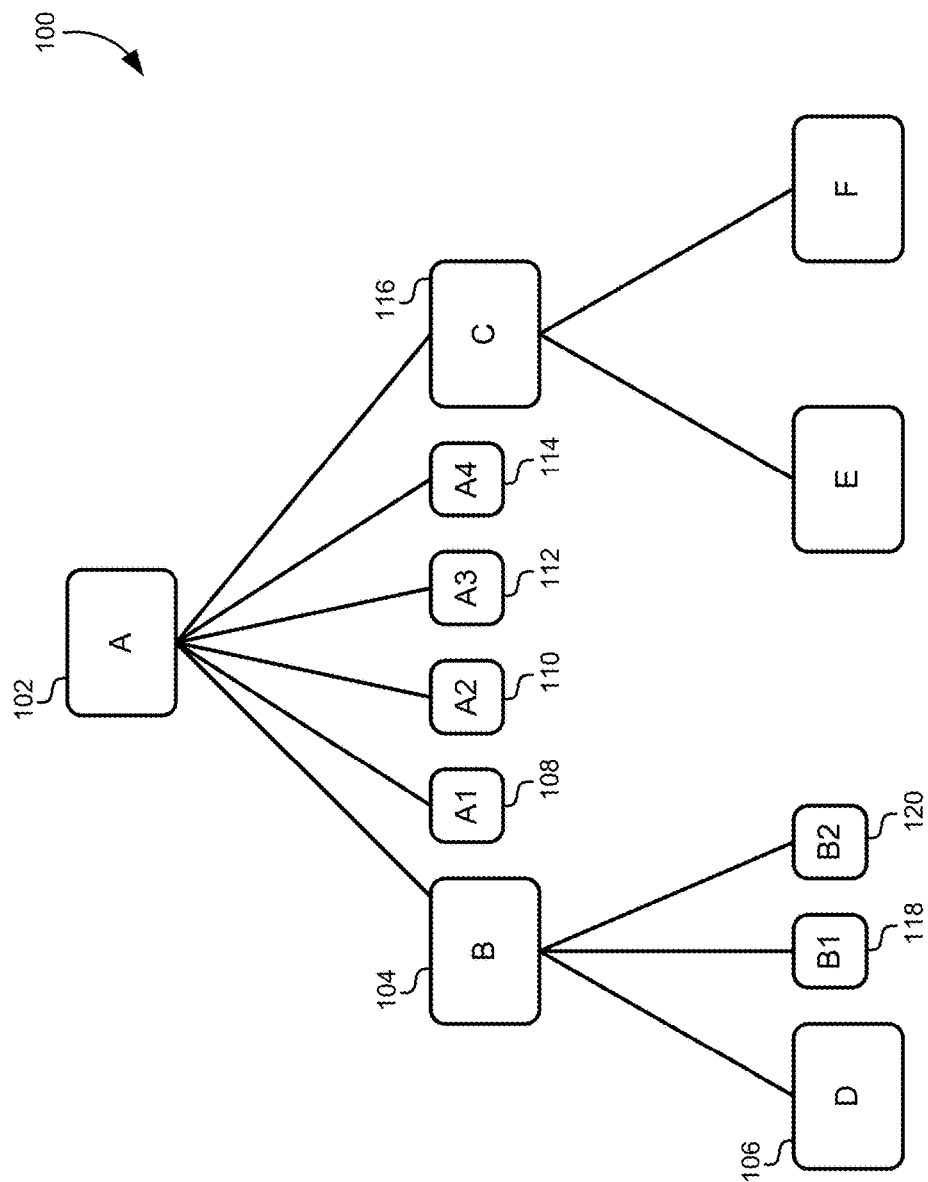
FIG. 1 illustrates a diagram of a first hierarchy organizing a group of records, according to some embodiments.

FIG. 1 illustrates a diagram 100 of a first hierarchy organizing a group of records, according to some embodiments. As used herein, the term "record" may refer to any data element used in a data structure. For example, a record may include a node in a binary tree, an element in an array, a node in a linked list, and/or the like. A record may also contain data elements, such as class objects. The record may also contain pointers to data objects such as database tables, database rows, employee records, and/or the like.

Diagram 100 illustrates a tree-based data structure for organizing the group of records in a hierarchy. It will be understood that the tree-based data structure is merely exemplary and not meant to be limiting. Any other type of data structure that may be organized as a hierarchy may be used, such as an array, a linked list, a vector, a hash table, and/or the like. Generally, the data structure hierarchy will include parent-child relationships. For example, record 102 is a parent record of record 104, and record 104 is a child record of record 102. In some embodiments, parent-child relationships may be represented by parent pointers and/or child pointers between records.

In the embodiments described herein, at least two types of records may be included in the hierarchy. A first type of record exists only as a child record. In other words, the first type of record does not have any children and does not act as a parent record to any other records. In diagram 100, records 108, 110, 112, 114 may all be considered the first type of record. The second type of record can exist as a child record and a parent record. In other words, the second type of record may have child records and may act as a parent to child records. In diagram 100, records 102, 104, 106 may all be considered the second type of record. In some embodiments, the record type is defined by the record itself, and not solely by its placement in the hierarchy. For example, when record 108 is added to the hierarchy, it is already defined as the first type of record, and therefore not be allowed to have any child records. Record 106 does not currently have any child records, but because it is defined as the second type of record, additional child records could be added to the hierarchy as children of record 106.

As described above, each of the records in the hierarchy can represent and/or include any different data values. Merely for descriptive purposes, this disclosure will assume that each record has at least one value either stored or referenced by the record, and this will be referred to as a "record value" or simply as the "value" associated with the record. In the hierarchy of diagram 100, the value associated with any record can be changed by its parent record. For example, record 104 and record 108 can have their values changed by record 102 because record 102 is the parent of record 104 and record 108.

When a parent record changes the value of a child record, this change can have a ripple effect through other records in the hierarchy. A number of different scenarios can be used to illustrate how this ripple effect can propagate through hierarchy. In a first scenario, a parent record can simply change the value of a child record. For example, record 102 can change the value of record 108. In some cases, this can be a direct change that does not have any other effects on other records in the hierarchy.

In a second scenario, a parent record can change the value of a child record, and this change can have a ripple effect on other sibling records (e.g. other children of the same parent record). This scenario can occur when the parent record is given a value to be allocated amongst its child records. The parent record can include a formula that allocates the value amongst its child records according to characteristics of the child records. For example, record 102 could distribute a value of 100 to each child record, including records 104, 108, 110, 112, 114, 116. The value can be distributed proportional to a value stored in each the child records. Alternatively, the value could be distributed equally amongst the child records. In some embodiments, when allocating a value amongst child records, the value will only be allocated amongst child records of the first type, i.e. records that do not have any child records. For example, record 102 could distribute a value of 100 to each child record of the first type, namely records 108, 110, 112, 114.

When a parent record makes a change to a child record, and a value has been allocated amongst other child records according to this second scenario, then the change to the child record may have a ripple effect on the other child records. Specifically, the allocations among the other sibling records may be reduced/increased to account for the change in the first child record. For example, if the value of 100 was allocated equally between records 108, 110, 112, 114, and record 102 then increases the allocation to record 108, the allocations to records 110, 112, 114 would need to decrease accordingly.

In another scenario, changes can be made to values of records of the second type in at least two ways. First, the value associated with the record itself can be changed as described above. For example, record 102 could change the value associated with record 104. Second, a change can be made to a value that was allocated to children of a record. For example, record 102 could give record 104 value of 100 distribute amongst child records 118, 120. Later, record 102 could change the value of 100 given to record 104. This would not change the value of record 104, but would instead change the values of records 118, 120 that had been distributed by record 104.

In the scenarios for changing record values described above, it should be clear that changing the value associated with one record can oftentimes propagate through changes to the values of other records. These hierarchical data structures can often represent things such as human organizations where resources are allocated in a top-down manner. Adding or decreasing resources in one area may necessarily decrease resources correspondingly in another area.

Because these hierarchical data structures can often be useful in representing human organizations, the data structures themselves can be augmented to represent varying organizational scenarios. In some embodiments, the same set of records can be organized into multiple hierarchies that coexist at the same time and which interact with each other in real time.

Figure 2:
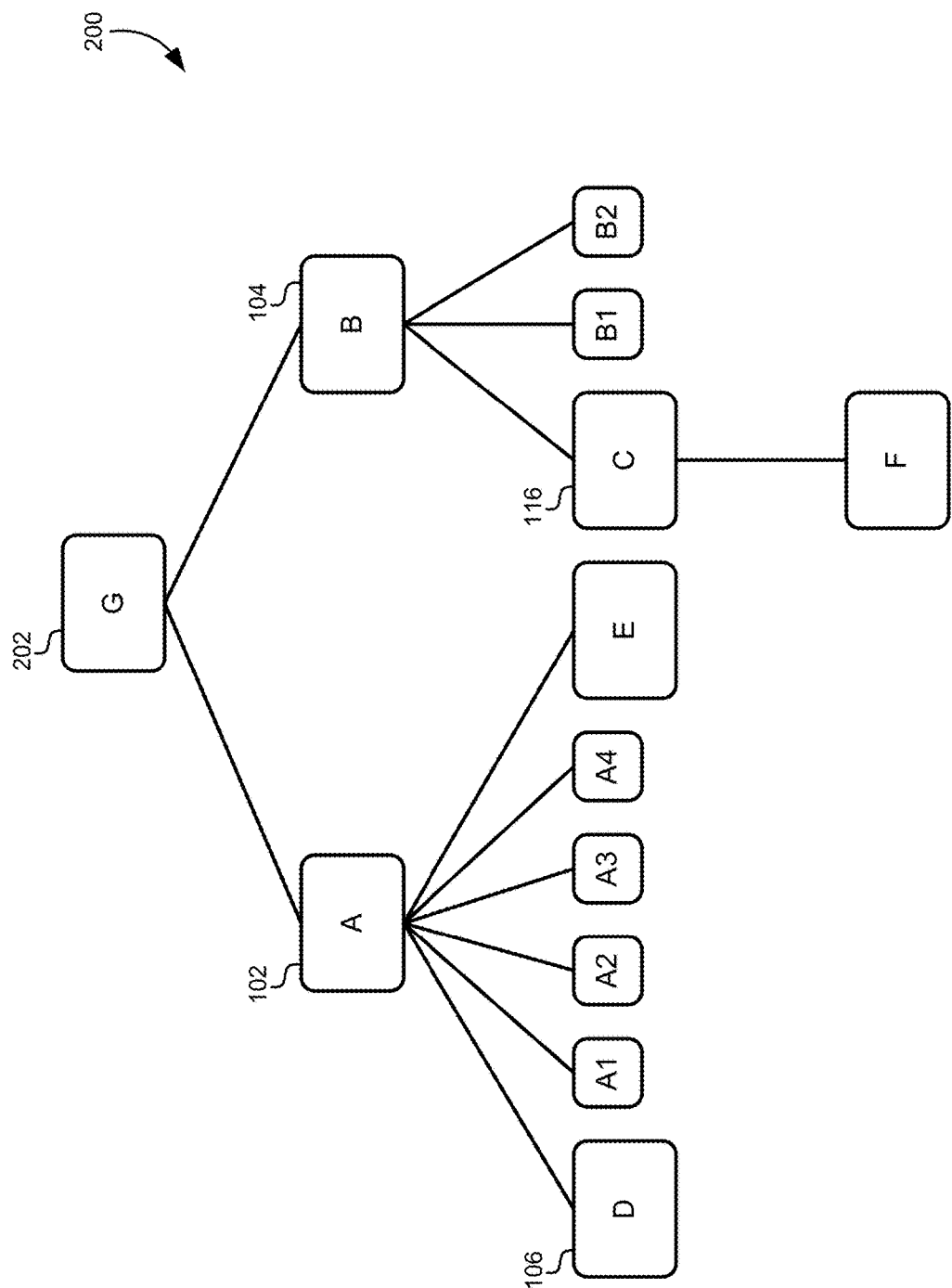
FIG. 2 illustrates a diagram of a second hierarchy organizing the same group of records, according to some embodiments.

FIG. 2 illustrates a diagram 200 of a second hierarchy organizing the same group of records, according to some embodiments. It should be noted that this second hierarchy includes records that were shown the first hierarchy of FIG. 1. Specifically, records 102, 104, 106, 116, along with other records are present in the second hierarchy of FIG. 2. However, the second hierarchy rearranges these records such that the parent-child relationships are not preserved from the first hierarchy. Instead, new parent-child relationships of an established. For example, record 102 was a parent node for record 104 in FIG. 1, and now record 102 and record 104 are sibling nodes to each other and child nodes of record 202.

The second hierarchy in diagram 200 includes all of the records from the first hierarchy in diagram 100. However, this need not always be the case. Additional concurrent hierarchies can include some or all of the records from other hierarchies. For example, record 116 could exist in the first hierarchy while not being included in the second hierarchy. Additionally, new records can be added the second hierarchy that are not included in the first hierarchy. For example, record 202 exists in the second hierarchy and is not found in the first hierarchy. In other words, no hierarchy needs to be a subset of another hierarchy. Generally, each coexisting hierarchy will include some overlap of records with another coexisting hierarchy.

The first hierarchy in the second hierarchy can be considered a single data structure with two different aspects. The two data structures can be implemented separately or together as a single object class in software. However, the two hierarchies are generally not independent. Changes made by a parent record to a child record in one data structure may have a ripple effect that affects child records in one or both of the coexisting hierarchies.

Figure 3:
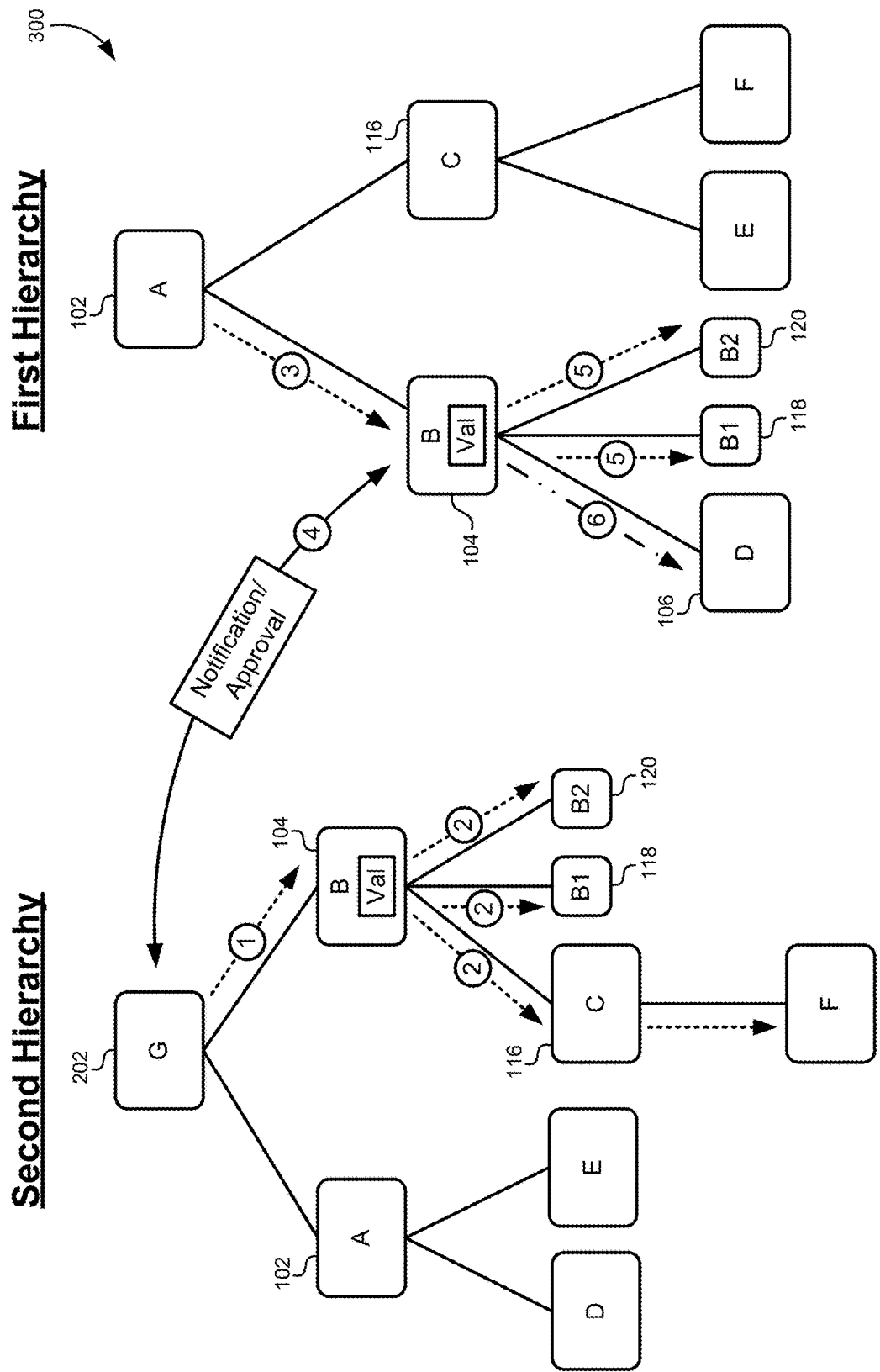
FIG. 3 illustrates a diagram of transactions in multiple hierarchies with the same group of records, according to some embodiments.

FIG. 3 illustrates a diagram 300 of transactions in multiple hierarchies with an overlapping group of records, according to some embodiments. This transaction is but one of many transactions that may be carried out through the concurrent multiple hierarchies. Therefore, this transaction is merely exemplary and not meant to be limiting. However, it will demonstrate how changes instigated through one hierarchy can be carried through to a second concurrent hierarchy.

As will be shown, any change in value initiated in one hierarchy can have a ripple effect in the other hierarchy. In addition to a value, each record can store a set of permissions that dictate how and when a record is allowed to propagate through changes to its children both inside and/or outside of the hierarchy initiating the change. The set of permissions may include whether a change to be made to a record value with permission, notification, and/or authorization of parents in other hierarchies. The set of permissions may also include whether changes should be propagated within the same hierarchy as the parent making the change, as well is whether changes should be pre-propagated to children in other hierarchies. Changes propagated in other hierarchies may require permission and/or notification from parent records in those hierarchies.

In this example, record 202 in the second hierarchy may initiate a change to its child record 104 in the second hierarchy. At this point, the set of permissions can be checked and it may be determined (at least in this case) that the change should be made to record 104 without permission or notification of parent records in other hierarchies, such as record 102 in the first hierarchy. The change to the value of record 104 may be allocated amongst all of its child records, such as records 118, 120. The set of permissions can then be checked for the parent record 104 as well as the child records 118, 120 to determine whether the change should be allocated amongst the child nodes, and whether any parent nodes in other hierarchies need to be notified or whether authorizations need to be granted. In this case, the set of permissions can dictate that the change may be allocated amongst the child records without seeking authorization from parent records in other hierarchies.

Continuing with this example, record 102 in the first hierarchy may also attempt to change the value of record 104. In this case, the set of permissions may dictate that an approval should be granted by parent records in other hierarchies, such as record 202 in the second hierarchy. A notification can be sent to record 202, which may in turn send an approval or denial to the first hierarchy either approving or denying the change. If the change is approved, then the set of permissions can be used to determine whether a change should be propagated to child records in the first hierarchy and/or the second hierarchy. In this case, it can be assumed that the set of permissions allows the value change in record 104 to be propagated to child records that are common in both hierarchies, i.e. records 118, 120. No allocation will be made to record 106 in the first hierarchy or to record 116 in the second hierarchy.

As one having skill in the art would readily see in light of this disclosure, many different permutations and combinations of permissions and transactions may be carried out on records that are organized in multiple concurrent hierarchies. The example above may be useful when multiple management hierarchies are used to manage employee records. The second hierarchy may represent a primary manager track that is allowed to make changes to employee salaries unilaterally. In contrast, project managers in the first hierarchy may make changes to employees only with permission by the line manager in the second hierarchy.

Figure 4:
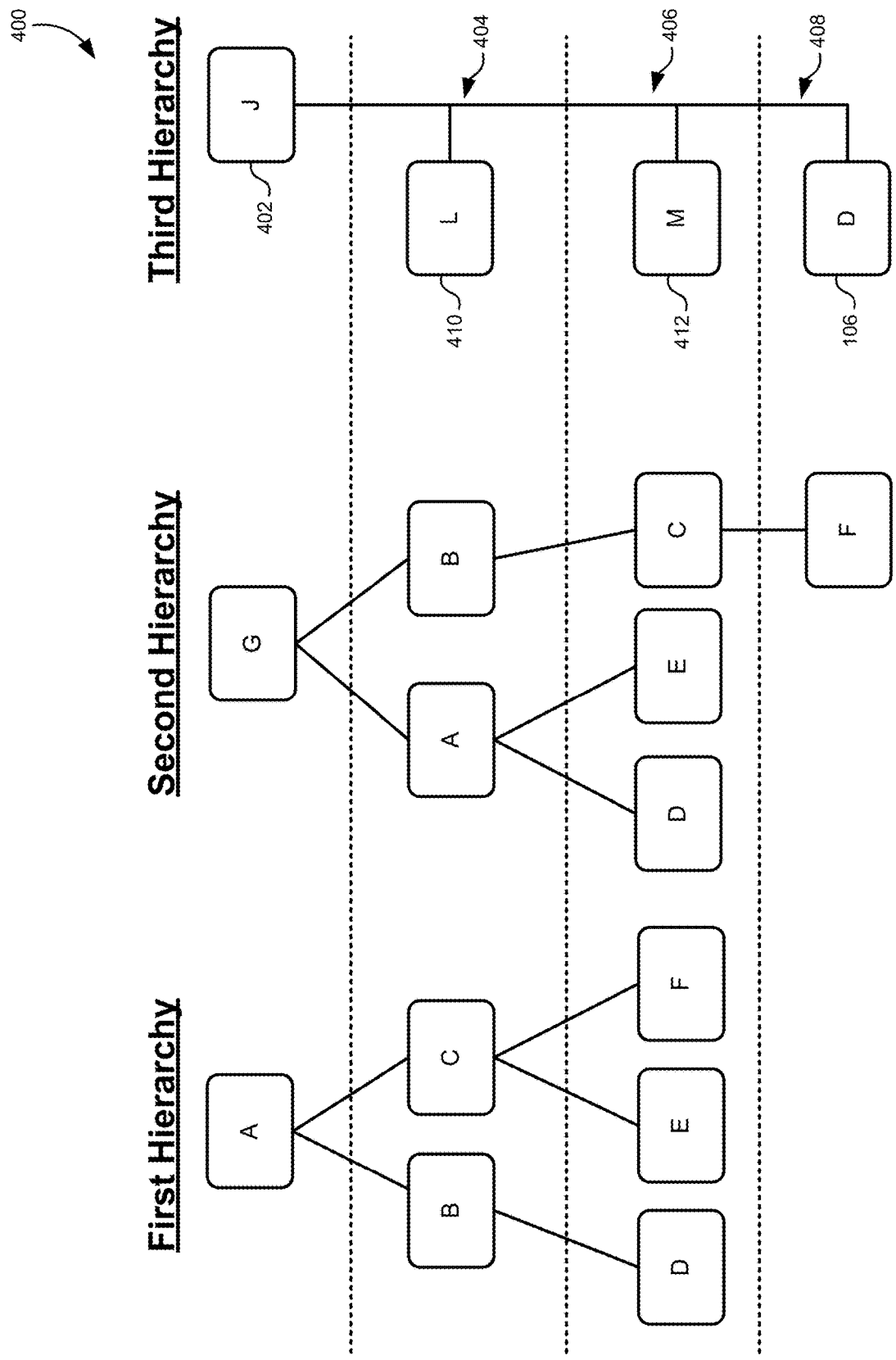
FIG. 4 illustrates a diagram of interactions between three hierarchies, according to some embodiments.

FIG. 4 illustrates a diagram 400 of interactions between three hierarchies, according to some embodiments. In this embodiment, the first hierarchy and the second hierarchy are as described in FIG. 1 and FIG. 2, respectively. By way of example, the third hierarchy can have a flatter structure than either the first or second hierarchy. The third hierarchy can also include more records that are not found in the first or second hierarchy. For example, record 402 is exclusive to the third hierarchy, while record 106 is found in all three hierarchies. This third hierarchy can serve as a control measure for changes that are initiated in the first or second hierarchies. For example, the third hierarchy can exercise approval control over any change made in the first hierarchy and/or the second hierarchy while not initiating any changes itself.

Records in the third hierarchy can act as parent records to records in the first and/or second hierarchies over which they maintain approval authority. For clarity, the parent-child relationship between the records in the third hierarchy and the child records in the first and second hierarchies are not drawn explicitly. However, record 410 can exercise parental and/or approval authority over all of the records in section 404 of the first hierarchy and/or the second hierarchy. Similarly, record 412 can exercise parental and/or approval authority over all of the records in section 406 of the first hierarchy and/or the second hierarchy, and so forth.

Figure 5:
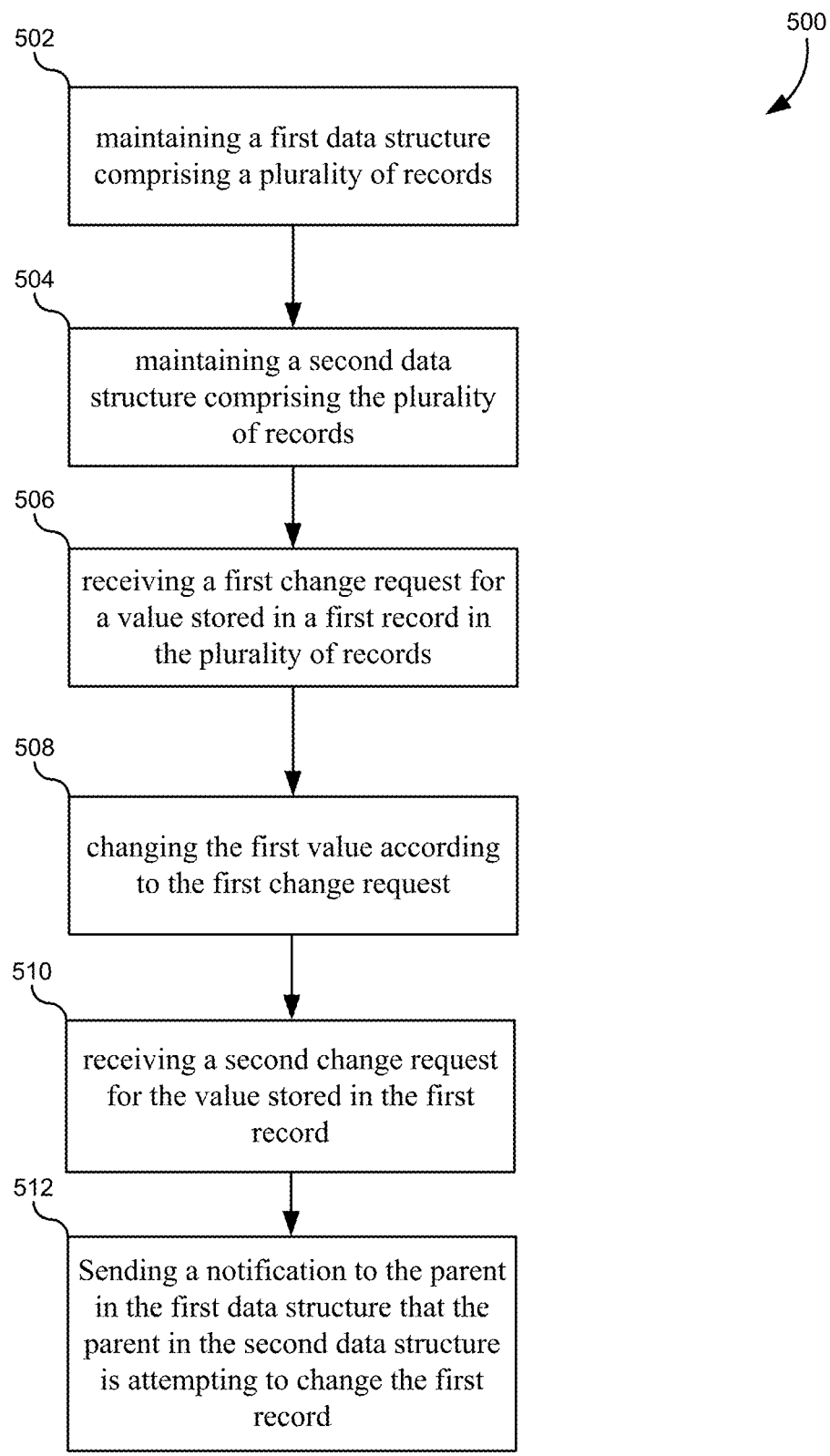
FIG. 5 illustrates a flowchart of a method for representing records concurrently in a plurality of hierarchies, according to some embodiments.

FIG. 5 illustrates a flowchart 500 of a method for representing records concurrently in a plurality of hierarchies, according to some embodiments. This method illustrates one example of how changes can be made in one hierarchy without approval/notification while changes made in the other hierarchy may require approval/notification. The method may include maintaining a first data structure comprising a plurality of records (502). The method may also include maintaining a second data structure comprising the plurality of records (504). The two data structures and plurality of records may be configured as described above in this disclosure. Specifically, the plurality of records may be organized in a first hierarchy of parent-child relationships in the first data structure, and the plurality of records may be organized in a second hierarchy of parent-child relationships in the second data structure. Each of the plurality of records may include a value. Each of the plurality of records may also include a pointer to another data structure, such as a database table/row, an employee record, and/or the like.

The method may additionally include receiving a first change request for a value stored in a first record in the plurality of records (506). The first change request may be received from a parent of the first record in the first data structure. A set of permissions may be queried, and it may be determined that no permission/notification is required from the second data structure. In this case, the method may further include changing the first value according to the first change request (508).

The method may also include receiving a second change request for the value stored in the first record (510). In this case, the second change request may be received from a parent of the first record in the second data structure. The set of permissions may be queried, and it may be determined that making a change to the first record by a parent in the second data structure requires a notification to be sent to the parent in the first data structure. It may also be determined that making a change to the first record by the parent in the second data structure requires permission to be granted by the parent in the first data structure. In this case, the method may also include sending a notification to the parent in the first data structure that the parent in the second data structure is attempting to change the first record (512).

After the notification is sent, the method may optionally include receiving an approval from the parent in the first data structure for the second change request, and changing the first value according the second change request. This additional step may take place when the parent in the first data structure approves of the change being made by the parent in the second data structure. Alternatively, the method may include receiving a denial from the parent in the first data structure for the second change request, and maintaining the first value according to the first change request. In other words, if the parent in the first data structure denies the change request made by the parent in the second data structure, then the value in the first record may be maintained according to the change originally made by the parent in the first data structure. As described above, the set of notifications, permissions, and/or value changes described by this method are merely exemplary, and it will be understood that any combination could be required based on how the set of permissions is defined for the data structures.

Before executing the method of FIG. 5, it may be necessary to generate the first and/or second data structure in the first place. This can be done by receiving a selection of an existing hierarchy of records. For example, a user could select an existing organizational chart for an enterprise and extract a line management hierarchy. This can be used to automatically generate the first data structure based on the existing hierarchy of records.

As will be described further below, the method may be augmented to receive a request to change the position of the first record in the first data structure. This may require any child records of the first record to be reassigned in the first data structure and/or the second data structure. In some embodiments, the method may include automatically reassigning any child records of the first record to the parent of the first record in the first data structure. This may also take place in the second data structure. Alternatively, the method may include maintaining the parent-child relationships between the first record and its child records in either or both of the data structures.

Although the method of FIG. 5 only involves two data structures, it will be understood that many additional data structures can also be involved in the transaction. For example, the method could include maintaining a third data structure comprising the plurality of records. As illustrated by FIG. 4, the third data structure could organize the plurality of records in one-to-many relationships vis-à-vis the first and second hierarchies. This third data structure could exercise parental and/or approval control over the first and second data structures. When a change is made to the first record in the first and/or second hierarchies, a notification can be sent to a corresponding parent in the third data structure, and an approval/denial could be received from the third data structure regarding the value change of the first record.

It should be appreciated that the specific steps illustrated in FIG. 5 provide particular methods of maintaining concurrent hierarchies according to various embodiments of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Having described the general concept of representing data records in multiple hierarchies concurrently, this disclosure will now turn to a specific example involving a managerial hierarchy of employee records. It will be understood that this example of managerial hierarchies is merely exemplary and not meant to be limiting. The concept of concurrently representing multiple hierarchies could be extended to many different applications, including database systems, network and computing resource hierarchies, transit and transportation scheduling, process priorities in multithreaded computing environments, logic decision trees, and/or the like.

Presenting the example of managerial hierarchies is done merely to provide an enabling disclosure and illustrate at least one example of how multiple concurrent hierarchies can be implemented in practice.

Figure 6:
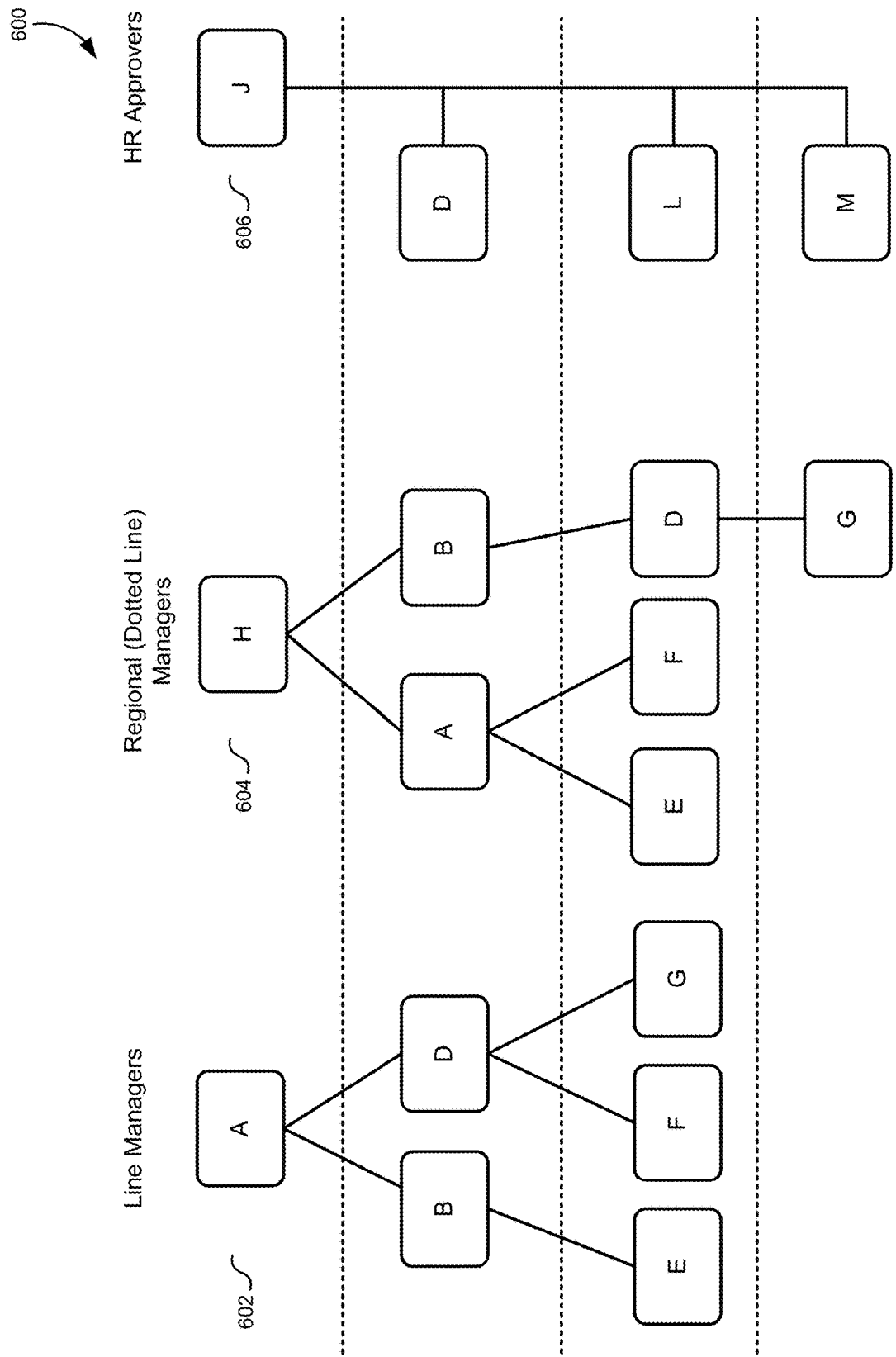
FIG. 6 illustrates a diagram of a multiple-hierarchy implementation in a management environment, according to some embodiments.

FIG. 6 illustrates a diagram 600 of a multiple-hierarchy implementation in a managerial hierarchy environment, according to some embodiments. The first hierarchy 602 may be used to represent line managers. A line manager hierarchy may begin at the top with the CEO, and extend downwards through division heads, level II managers, level I managers, department managers, and so forth. Generally, the line manager hierarchy will be given primary decision-making authority as far as employee compensation. Turning briefly back to the discussion of FIG. 1, the records of the first type may represent employees within the managerial purview of a line manager represented by a parent record. The records of the second type may represent other managers that fall within the managerial purview of a line manager represented by the parent record. Line managers can allocate funds given to their department equally, proportionally, or otherwise amongst the child records representing employees. Line managers can also give funds to lower-level managers to allocate amongst their respective employees. In most cases, line managers are given authority to make changes to employee compensation without requiring approval from other hierarchies.

The second hierarchy 604 may represent what may be referred to herein as dotted-line managers. Generally, a dotted-line manager provides a second level of supervision for an employee. Oftentimes, a dotted-line manager may have a closer relationship and more direct supervision than a line manager. Occasionally, a dotted-line manager can provide inputs to a line manager for performance review and compensation adjustments. By way of example, a dotted-line manager may include a project manager, an office manager in a particular geographic location, and/or the like. According to some embodiments, dotted-line managers in the second hierarchy 604 may provide salary adjustment recommendations that may be approved by line managers in the first hierarchy 602. When a dotted-line manager makes a change to a value of a child record (e.g. adjusts an employee's compensation), a notification may be sent to a parent record (line manager) in the first hierarchy 602. This notification may or might not require approval as discussed above.

The third hierarchy 606 may represent a human resource structure. Generally, a human resource department does not provide changes to employee records, such as changes to compensation. However, a human resource department can provide approvals for final compensation packages. Therefore, records in the third hierarchy 606 may receive notifications from changes made to either the first hierarchy 602 and/or the second hierarchy 604. Some embodiments may require a final approval from the third hierarchy 606 in order to finalize a value adjustment related to compensation.

FIG. 7 illustrates an interface 700 for defining multiple hierarchies, according to some embodiments. Similarly, FIG. 8 illustrates a continuation of an interface 800 for defining multiple hierarchies, according to some embodiments. Interface 700 and interface 800 are comprised of three regions for defining a primary hierarchy, a secondary hierarchy, and a tertiary hierarchy. These interfaces may be used to define a plurality of management hierarchies for an organization that can coexist and interact with each other as described above. Each of these three regions may have same or similar fields and/or behaviors. These fields and behaviors may correspond to user inputs for defining aspects of each hierarchy. These aspects will be discussed below in further detail.

For each hierarchy, a source 702 may be selected. The source may instruct the computer system on how to construct the hierarchy and a source of data from which to pull parent-child relationships. Possible sources may include a primary manager hierarchy extracted from human resource data that defines relationships of line managers. Another source may include other manager hierarchies that can be used to define dotted-line management relationships extracted from human resource data. If another manager hierarchy is selected, the user may be presented with options such as project manager, regional manager, resource manager, and/or the like, in order to further define a management type. Another source may include a formula for constructing a management hierarchy. Logical operators may be combined to filter and select employee names that should be added to the hierarchy. Another resource may include a position tree that can extract a hierarchy based on a structure of the position tree. In this concept, managers all have unique positions that have defined relationships with each other. The computer system can extract each of the positions and logically arranged them into parent-child relationships to form a hierarchy. Similar to the position tree, a department tree may also be used as the source of a hierarchy. A department tree, or organizational chart, generally define a top-down structure for an organization. This can automatically construct records of the first type and the second type corresponding to employees and managers.

When constructing the hierarchies, it is possible that holes may exist in whatever source data is accessed to construct the hierarchies. A selection for "When Manager Not Found" 704 can be presented to allow users to specify instructions that should be executed when managers are not found in the hierarchy. This can be selectively enabled and disabled when the source is selected. It can be cleared and/or disabled when no management holes are present in the source. Possible values for this control include leaving the position blank and unfilled, using a primary manager from another hierarchy, and/or an instruction to climb the current hierarchy to assign the next manager found. Missing relationships in the hierarchy generated from the source 702 may be documented in the log file using control 706.

A default access level 708 can be used to select an access level for managers in the hierarchy. For example, possible values may include "Updates Allowed," "No Updates Allowed," and/or "No Access." As with determining a hierarchy source, a formula 710 can also be used to determine a default access level. In a general sense, the access level may specify how permissions and/or notifications are required across different hierarchies. In the general hierarchies described earlier in this disclosure, the access level may be the same as the set of permissions that can be consulted to determine whether a parent record is allowed to make a change to a child record and whether notifications and/or permissions are required.

FIG. 9 illustrates an interface 900 for exploring multiple hierarchies through a single record, according to some embodiments. Interface 900 illustrates an employee-centric view of different management hierarchies in this case, each of the three management hierarchies can be navigated for an employee (Anadi Hamm). A primary management area 902 can be used to view and/or edit a primary line management hierarchy. A secondary management area 904 can be used to view and/or edit a secondary manager hierarchy. Finally, a third management area 906 can be used to view and/or edit a third reviewing hierarchy, such as a human resources hierarchy. An access level area 908 can be used to determine the set of permissions for each of the management hierarchies.

FIG. 10 illustrates an interface 1000 for rearranging multiple hierarchies, according to some embodiments. When an employee is moved within one or more of the hierarchies, a decision must be made as to how to deal with child records associated with the employee. Interface 1000 allows an administrator to select a number of options that can be used to handle employee reassignment. In some cases, child records, or subordinates, are not reassigned and simply remain child records of the employee. Alternatively, the child records can be reassigned up one level in the hierarchy to the manager of the employee being reassigned. Interface 1000 also allows notifications to be sent to parent records in each of the hierarchies when child records are either reassigned or maintained as before.

In some embodiments, a dedicated hardware platform may be designed to implement the functionality described herein. This dedicated hardware may be designed using processors, memories, microcontrollers, buses, communication ports, network access ports, adapters, digital circuits, analog circuits, instruction sets, and/or the like, that are well-known in the art and would be readily understood by one having skill in the art. Block diagrams described herein represent an abstraction of the functions that may be implemented using these types of hardware. After reading this disclosure, one having skill in the art could use these well-known circuit elements to construct the systems described below to implement these methods and systems.

Figure 11:
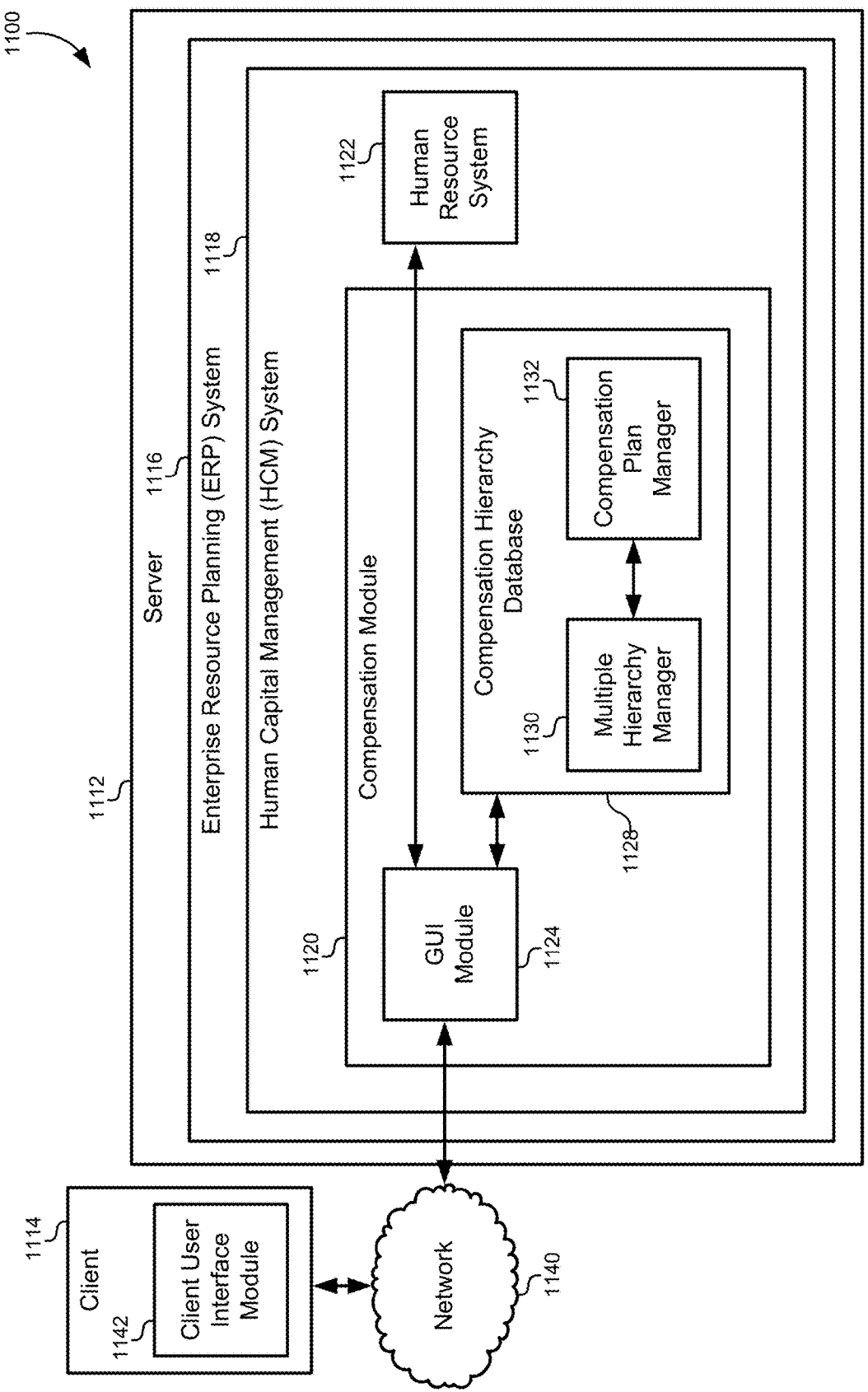
FIG. 11 illustrates a diagram of an example system for implementing a multiple hierarchy, according to some embodiments.

FIG. 11 illustrates a diagram of an example system 1100 for implementing a multiple hierarchy, according to some embodiments. The example system 1100 includes a server 1112 running an Enterprise Resource Planning (ERP) application that includes a Human Capital Management (HCM) system 1118. The HCM system 1118 is adapted to include a compensation module 1120 in communication with a Human Resource (HR) system 1122. The compensation module 1120 includes a compensation hierarchy database 1128 in communication with a Graphical User Interface (GUI) module 1124. For illustrative purposes, the compensation hierarchy database 1128 is shown further communicating with the HR system 1122.

For illustrative purposes, the compensation hierarchy database 1128 is shown including a multiple hierarchy manager 1130 for allotting compensation according to a compensation plan manager 1132. Note that many electronically represented hierarchies may be implemented via the compensation hierarchy database 1128 besides those that are explicitly shown. Furthermore, the associations between the multiple hierarchy manager 1130 and the compensation plan manager 1132 shown in FIG. 11 are merely illustrative.

Functionality enabling an organization, such as a business, to adjust or manipulate hierarchies and associated compensation plans maintained by the compensation hierarchy database 1128 is incorporated in GUI module 1124. A user may log directly into the GUI 1124 via the computer system associated with the server 1112. Alternatively, a user, such as a manager, may employ a client 1114 and accompanying client User Interface (UI) module 1142 to log into the system 1100 and to access functionality afforded by the compensation module 1120. The client UI 1142 may be implemented via a browser. Alternatively, or in addition, certain server-side functionality and software, such as software represented by the GUI module 1124, may be implemented on the client UI module 1142 without departing from the scope of the present teachings. The client 1114 may communicate with the server 1112 via a network 1140, such as a Local Area Network (LAN), a Wide Area Network (WAN), the Internet, and/or another network.

In the present example embodiment, the hierarchies in the multiple hierarchy manager 1130 represent compensation hierarchies. For the purposes of the present discussion, a compensation hierarchy may include any power structure defining powers or privileges of personnel to make compensation-related decision for an organization. The compensation-related decisions may include, for example, personnel salaries, bonuses, stock allocations, vendor payments, product/service procurement payments, and so on. The hierarchy representation may be considered to include the fund allotments (e.g., salaries, bonuses, etc.) themselves. The term "compensation" may refer to any fund allotment made or to be made by an organization, such as a business.

In operation, an administrator may log into the compensation module 1120 to set up the compensation hierarchy database 1128 by defining initial hierarchies, associating hierarchies with compensation plans, developing any necessary compensation plans, and so on. Once the compensation hierarchy database 1128 is setup, personnel, such as managers, that have been authorized (via the initial setup) to access the compensation hierarchy database 1128 may login to the database 1128 via the client 1114 and GUI module 1124.

A given user, such as a manager, that logs into the system 1100 via a login interface screen will have an initial set of privileges associated therewith. When a user logs into the system 1100, the user supplies login information, which is associated with the user's privileges. The privileges associated with a particular user may specify, for example, that the user may have access to tools to adjust compensation for one or more subordinates and/or that the user may have further access to tools to adjust the hierarchy structure itself, such as by moving representations of subordinates into different positions in the hierarchy. For example, an authorized user may reassign a supervisory role of a first person to a second person. The supervisory role may include compensation decision-making authority for one or more subordinates of the first person.

An administrator that logs into the system 1100 may have ultimate authority, such as to change compensation allotment rules or plans to be enforced by the organization; to assign override approvers to certain tasks performed by certain managers; or to otherwise the change the entire set of hierarchies managed by the multiple hierarchy manager 1130. For the purposes of the present discussion, an intercept approver may be any person, or electronic hierarchy representation of the person, of an organization that is granted authority to approve one or more predetermined types of decisions made by one or more persons specified in the multiple hierarchy of the organization. An intercept approver is said to intercept a portion of the multiple hierarchy. The intercept approver may lack other direct supervisory privileges over a particular manager or worker other than approving or denying decisions made by the manager or worker pertaining to a given task or tasks.

For the purposes of the present discussion, a manager may be any person of an organization that has privileges to control activities, compensation, or other privileges associated with another person of an organization. For example, a manager may have other managers and/or employees that report to them, i.e., direct subordinates, and the manager may have the authority or privilege enabling the manager to make salary adjustments, bonus allotments, position reassignments, and other adjustments to the privileges of the directly subordinate managers or employees. A manager may have access to performance ratings and work submitted by subordinates, which may enable a manager to make more informed compensation-related decisions.

In an example operative scenario, an organization employing the system 1100 will enable various project managers, also called line managers, that oversee particular projects or groups, to make certain compensation adjustments pertaining to subordinate workers. This enables better-informed decision making, as managers may have better knowledge as to the performance of direct subordinates than HR personnel.

For the purposes of the present discussion, a line manager may be any person within an organization that oversees a particular group of one or more other persons in the organization but that is distinct from personnel of a Human Resources department of the organization.

For the purposes of the present discussion, changes to a workers salary are considered to represent changes to the multiple hierarchy, since a salary level associated with a given worker represents a privilege associated therewith. Similarly, changes to a power structure itself, such as those made by changing the supervisors of certain workers, are also considered to represent changes to the multiple hierarchy.

Note that the terms "multiple hierarchy" and "electronic representation of a multiple hierarchy" are employed interchangeably herein. In practice, the electronic representation of a multiple hierarchy should substantially conform to the actual multiple hierarchy of the organization/business. The system 1100, including the compensation module 20, includes mechanisms for facilitating enforcement of the electronic representations of the multiple hierarchies. In particular, when a changes is made to an electronic representation of a multiple hierarchy, notifications are sent via the GUI module 1124 to appropriate personnel to facilitate enforcement.

In one embodiment, the various modules and systems in FIG. 11 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

Each of the methods described herein may be implemented by a computer system, such as computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 12:
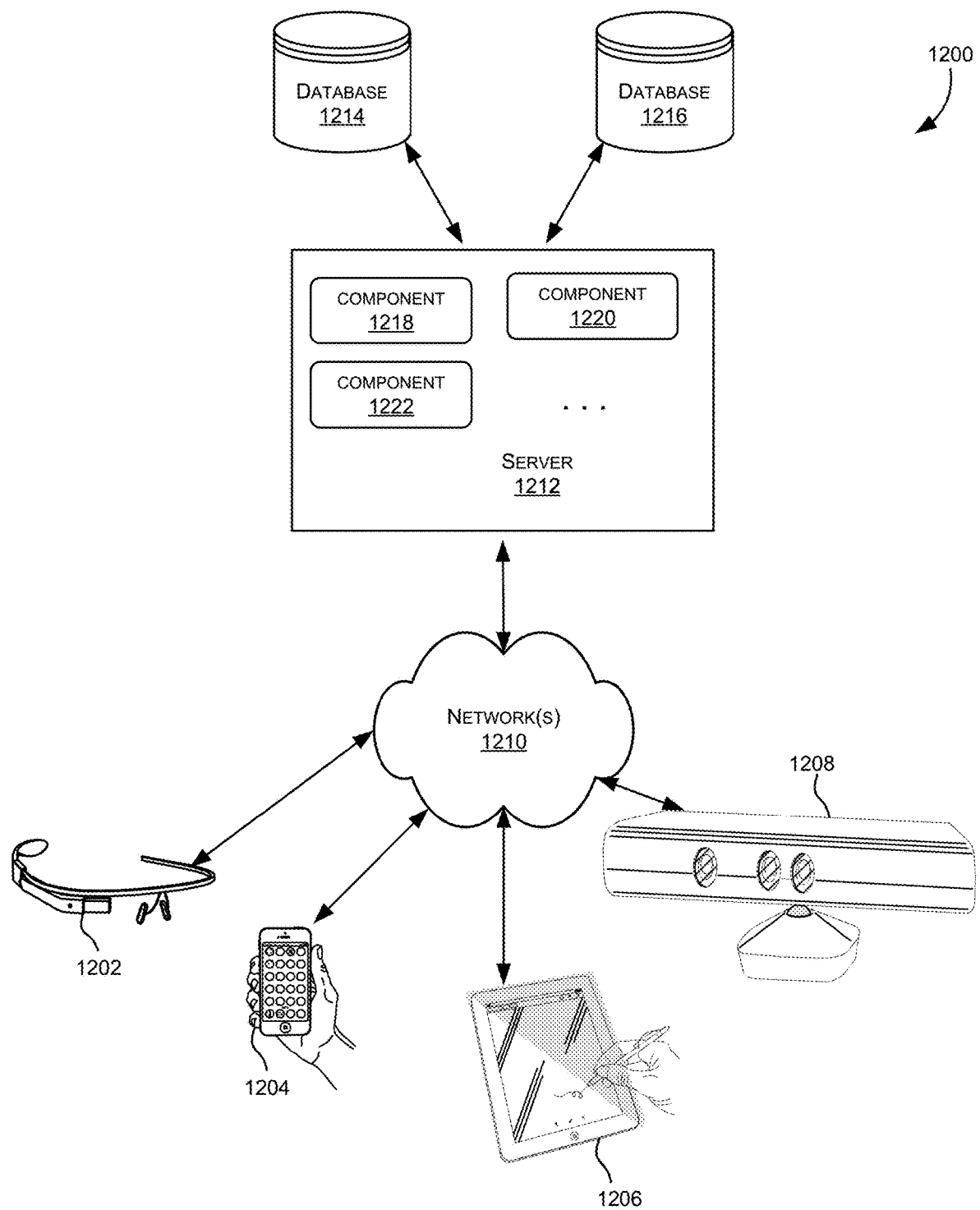
FIG. 12 illustrates a simplified block diagram of a distributed system for implementing some of the embodiments.

FIG. 12 depicts a simplified diagram of a distributed system 1200 for implementing one of the embodiments. In the illustrated embodiment, distributed system 1200 includes one or more client computing devices 1202, 1204, 1206, and 1208, which are configured to execute and operate a client application such as a web browser, proprietary client (e.g., Oracle Forms), or the like over one or more network(s) 1210. Server 1212 may be communicatively coupled with remote client computing devices 1202, 1204, 1206, and 1208 via network 1210.

In various embodiments, server 1212 may be adapted to run one or more services or software applications provided by one or more of the components of the system. In some embodiments, these services may be offered as web-based or cloud services or under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

In the configuration depicted in the figure, the software components 1218, 1220 and 1222 of system 1200 are shown as being implemented on server 1212. In other embodiments, one or more of the components of system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in the figure is thus one example of a distributed system for implementing an embodiment system and is not intended to be limiting.

Client computing devices 1202, 1204, 1206, and/or 1208 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1202, 1204, 1206, and 1208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1210.

Although exemplary distributed system 1200 is shown with four client computing devices, any number of client computing devices may be supported. Other devices, such as devices with sensors, etc., may interact with server 1212.

Network(s) 1210 in distributed system 1200 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1210 can be a local area network (LAN), such as one based on Ethernet, Token-Ring and/or the like. Network(s) 1210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1212 may be adapted to run one or more services or software applications described in the foregoing disclosure. For example, server 1212 may correspond to a server for performing processing described above according to an embodiment of the present disclosure.

Server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1212 may include one or more applications to analyze and consolidate data feeds and/or event updates received from users of client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1212 may also include one or more applications to display the data feeds and/or real-time events via one or more display devices of client computing devices 1202, 1204, 1206, and 1208.

Distributed system 1200 may also include one or more databases 1214 and 1216. Databases 1214 and 1216 may reside in a variety of locations. By way of example, one or more of databases 1214 and 1216 may reside on a non-transitory storage medium local to (and/or resident in) server 1212. Alternatively, databases 1214 and 1216 may be remote from server 1212 and in communication with server 1212 via a network-based or dedicated connection. In one set of embodiments, databases 1214 and 1216 may reside in a storage-area network (SAN). Similarly, any necessary files for performing the functions attributed to server 1212 may be stored locally on server 1212 and/or remotely, as appropriate. In one set of embodiments, databases 1214 and 1216 may include relational databases, such as databases provided by Oracle, that are adapted to store, update, and retrieve data in response to SQL-formatted commands.

Figure 13:
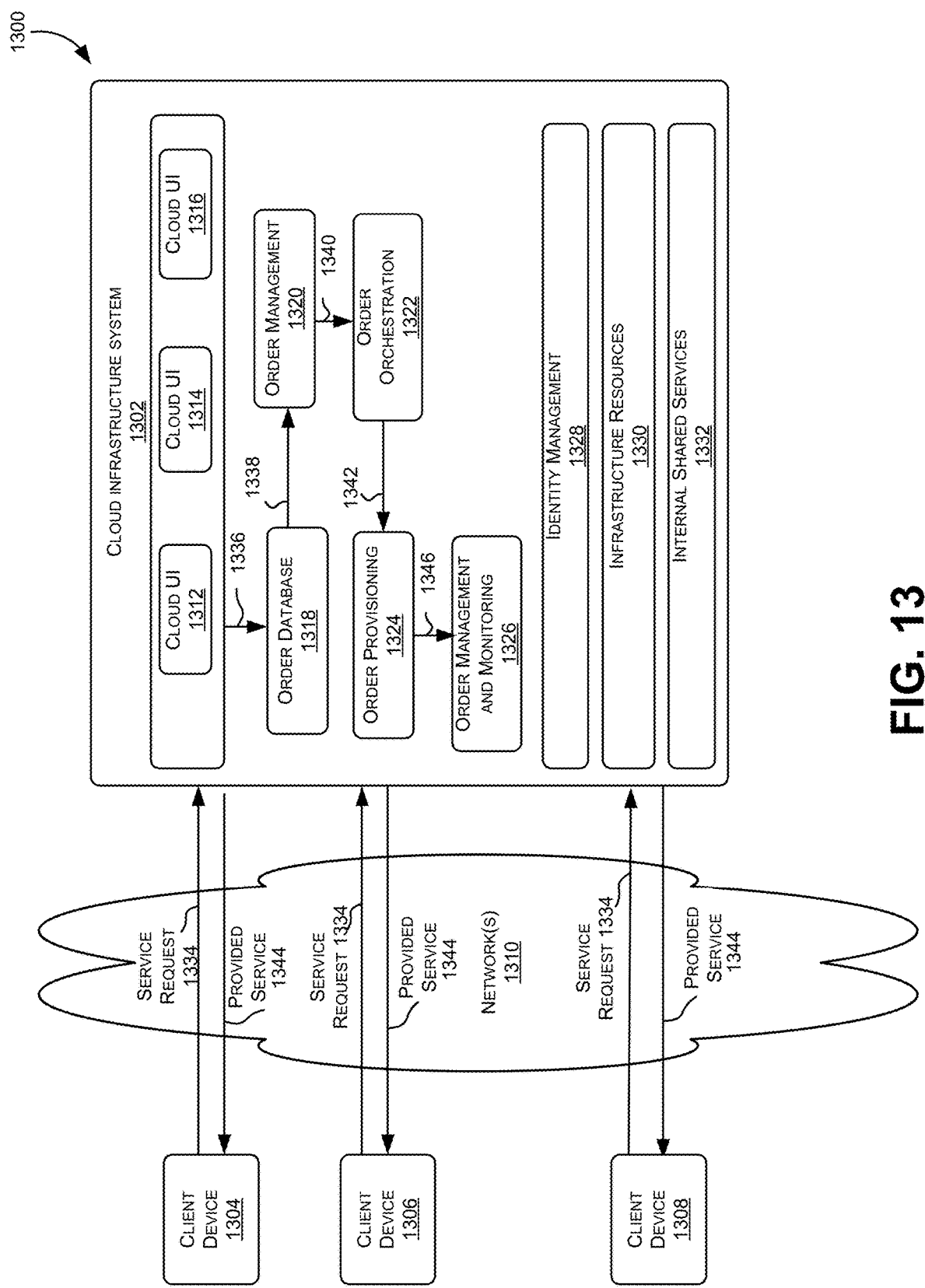
FIG. 13 illustrates a simplified block diagram of components of a system environment by which services provided by the components of an embodiment system may be offered as cloud services.

FIG. 13 is a simplified block diagram of one or more components of a system environment 1300 by which services provided by one or more components of an embodiment system may be offered as cloud services, in accordance with an embodiment of the present disclosure. In the illustrated embodiment, system environment 1300 includes one or more client computing devices 1304, 1306, and 1308 that may be used by users to interact with a cloud infrastructure system 1302 that provides cloud services. The client computing devices may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302.

It should be appreciated that cloud infrastructure system 1302 depicted in the figure may have other components than those depicted. Further, the embodiment shown in the figure is only one example of a cloud infrastructure system that may incorporate an embodiment of the invention. In some other embodiments, cloud infrastructure system 1302 may have more or fewer components than shown in the figure, may combine two or more components, or may have a different configuration or arrangement of components.

Client computing devices 1304, 1306, and 1308 may be devices similar to those described above for 1202, 1204, 1206, and 1208.

Although exemplary system environment 1300 is shown with three client computing devices, any number of client computing devices may be supported. Other devices such as devices with sensors, etc. may interact with cloud infrastructure system 1302.

Network(s) 1310 may facilitate communications and exchange of data between clients 1304, 1306, and 1308 and cloud infrastructure system 1302. Each network may be any type of network familiar to those skilled in the art that can support data communications using any of a variety of commercially-available protocols, including those described above for network(s) 1210.

Cloud infrastructure system 1302 may comprise one or more computers and/or servers that may include those described above for server 1212.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some embodiments, the services provided by cloud infrastructure system 1302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some embodiments, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1302 may also include infrastructure resources 1330 for providing the resources used to provide various services to customers of the cloud infrastructure system. In one embodiment, infrastructure resources 1330 may include pre-integrated and optimized combinations of hardware, such as servers, storage, and networking resources to execute the services provided by the PaaS platform and the SaaS platform.

In some embodiments, resources in cloud infrastructure system 1302 may be shared by multiple users and dynamically re-allocated per demand. Additionally, resources may be allocated to users in different time zones. For example, cloud infrastructure system 1330 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1332 may be provided that are shared by different components or modules of cloud infrastructure system 1302 and by the services provided by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1302, and the like.

In one embodiment, as depicted in the figure, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In exemplary operation 1334, a customer using a client device, such as client device 1304, 1306 or 1308, may interact with cloud infrastructure system 1302 by requesting one or more services provided by cloud infrastructure system 1302 and placing an order for a subscription for one or more services offered by cloud infrastructure system 1302. In certain embodiments, the customer may access a cloud User Interface (UI), cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 that the customer intends to subscribe to.

After an order has been placed by the customer, the order information is received via the cloud UIs, 1312, 1314 and/or 1316.

At operation 1336, the order is stored in order database 1318. Order database 1318 can be one of several databases operated by cloud infrastructure system 1318 and operated in conjunction with other system elements.

At operation 1338, the order information is forwarded to an order management module 1320. In some instances, order management module 1320 may be configured to perform billing and accounting functions related to the order, such as verifying the order, and upon verification, booking the order.

At operation 1340, information regarding the order is communicated to an order orchestration module 1322. Order orchestration module 1322 may utilize the order information to orchestrate the provisioning of services and resources for the order placed by the customer. In some instances, order orchestration module 1322 may orchestrate the provisioning of resources to support the subscribed services using the services of order provisioning module 1324.

In certain embodiments, order orchestration module 1322 enables the management of business processes associated with each order and applies business logic to determine whether an order should proceed to provisioning. At operation 1342, upon receiving an order for a new subscription, order orchestration module 1322 sends a request to order provisioning module 1324 to allocate resources and configure those resources needed to fulfill the subscription order. Order provisioning module 1324 enables the allocation of resources for the services ordered by the customer. Order provisioning module 1324 provides a level of abstraction between the cloud services provided by cloud infrastructure system 1300 and the physical implementation layer that is used to provision the resources for providing the requested services. Order orchestration module 1322 may thus be isolated from implementation details, such as whether or not services and resources are actually provisioned on the fly or pre-provisioned and only allocated/assigned upon request.

At operation 1344, once the services and resources are provisioned, a notification of the provided service may be sent to customers on client devices 1304, 1306 and/or 1308 by order provisioning module 1324 of cloud infrastructure system 1302.

At operation 1346, the customer's subscription order may be managed and tracked by an order management and monitoring module 1326. In some instances, order management and monitoring module 1326 may be configured to collect usage statistics for the services in the subscription order, such as the amount of storage used, the amount data transferred, the number of users, and the amount of system up time and system down time.

In certain embodiments, cloud infrastructure system 1300 may include an identity management module 1328. Identity management module 1328 may be configured to provide identity services, such as access management and authorization services in cloud infrastructure system 1300. In some embodiments, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.) Identity management module 1328 may also include the management of descriptive information about each customer and about how and by whom that descriptive information can be accessed and modified.

Figure 14:
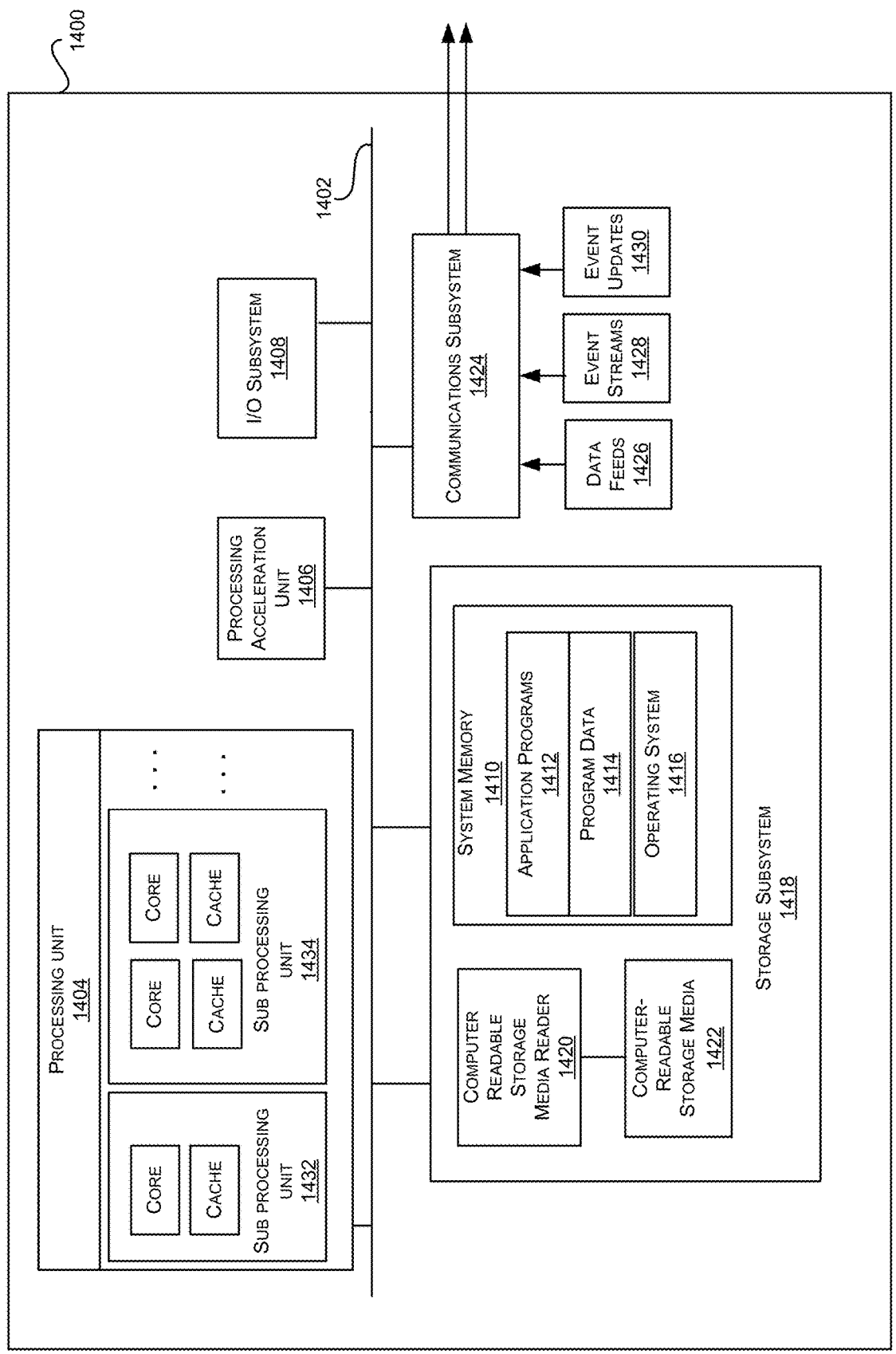
FIG. 14 illustrates an exemplary computer system, in which various embodiments may be implemented.

FIG. 14 illustrates an exemplary computer system 1400, in which various embodiments of the present invention may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1418 may also provide a tangible computer-readable storage medium for storing the basic programming and data constructs that provide the functionality of some embodiments. Software (programs, code modules, instructions) that when executed by a processor provide the functionality described above may be stored in storage subsystem 1418. These software modules or instructions may be executed by processing unit 1404. Storage subsystem 1418 may also provide a repository for storing data used in accordance with the present invention.

Storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, causes the one or more processors to perform operations comprising:
   maintaining, by a computer system, a first data structure comprising a plurality of records, the plurality of records being organized in a first hierarchy of parent-child relationships in the first data structure;
   maintaining, by the computer system, a second data structure comprising the plurality of records, the plurality of records being organized in a second hierarchy of parent-child relationships in the second data structure;
   receiving, by the computer system, a change request for a value stored in a first record in the plurality of records, the change request being received from a parent record in the second data structure of the first record; and
   sending, by the computer system, a notification to a parent record of the first record in the first data structure that the parent record in the second data structure is attempting to change the first record, wherein the notification is sent to the parent record in the first data structure before the change request is allowed to change the value stored in the first record.

2. The non-transitory computer-readable medium of claim 1, wherein the operations further comprise:
   receiving, by the computer system, a second change request for the value stored in the first record, the second change request being received from the parent record of the first record in the first data structure;
   changing, by the computer system, the first value according to the second change request.

3. The non-transitory computer-readable medium of claim 1, wherein the operations further comprise:
   receiving an approval from the parent record in the first data structure for the change request; and
   changing the value according to the change request.

4. The non-transitory computer-readable medium of claim 1, wherein the operations further comprise:
   receiving an denial from the parent record in the first data structure for the change request; and
   maintaining the value according to the value prior to the change request.

5. The non-transitory computer-readable medium of claim 1, wherein the operations further comprise:
   receiving a selection of an existing hierarchy of records; and
   generating the first data structure automatically based on the existing hierarchy of records.

6. The non-transitory computer-readable medium of claim 1, wherein the operations further comprise:
   receiving a request to change a position of the first record in the first data structure; and
   automatically reassigning any child records of the first record to the parent record of the first record in the first data structure.

7. The non-transitory computer-readable medium of claim 1, wherein the operations further comprise:
   receiving a request to change a position of the first record in the first data structure; and
   maintaining a parent-child relationship between the first record and any child records of the first record in the first data structure.

8. The non-transitory computer-readable medium of claim 1, wherein the operations further comprise:
   maintaining a third data structure comprising the plurality of records, the plurality of records being organized in one-to-many relationships in the third data structure.

9. The non-transitory computer-readable medium of claim 8, wherein the operations further comprise:
   sending a notification to a one-to-many partner in the third data structure that the first record was changed by the parent record in the second data structure; and
   receiving an approval from the one-to-many partner in the third data structure for the change request.

10. The non-transitory computer-readable medium of claim 8, wherein the third data structure represents a Human Resources structure for reviewing employee compensation.

11. The non-transitory computer-readable medium of claim 1, wherein the first data structure represents a primary manager hierarchy.

12. The non-transitory computer-readable medium of claim 1, wherein the second data structure represents a secondary manager hierarchy.

13. The non-transitory computer-readable medium of claim 1, wherein the first record comprises an employee record.

14. The non-transitory computer-readable medium of claim 1, wherein the operations further comprise:
   accessing a rule set that defines when notifications are sent between the first data structure and the second data structure.

15. The non-transitory computer-readable medium of claim 1, wherein the change request comprises a request received from the parent record in the second hierarchy to change a value stored in a child record of the parent record in the second hierarchy.

16. The non-transitory computer-readable medium of claim 1, wherein the parent record in the second data structure is assigned as a child of the first record in the first data structure.

17. The non-transitory computer-readable medium of claim 1, wherein the change request for the value stored in a first record is propagated as changes into values stored in child records in the second data structure.

18. The non-transitory computer-readable medium of claim 17, wherein the changes propagated into values stored in child records in the second data structure are not propagated into values stored in child records in the first data structure.

19. A system comprising:
   one or more processors; and
   one or more memories comprising instructions that, when executed by the one or more processors, cause the one or more processors to perform operations comprising:
      maintaining, by a computer system, a first data structure comprising a plurality of records, the plurality of records being organized in a first hierarchy of parent-child relationships in the first data structure;
      maintaining, by the computer system, a second data structure comprising the plurality of records, the plurality of records being organized in a second hierarchy of parent-child relationships in the second data structure;
      receiving, by the computer system, a change request for the value stored in a first record in the plurality of records, the change request being received from a parent record in the second data structure of the first record; and sending, by the computer system, a notification to a parent record of the first record in the first data structure that the parent record in the second data structure is attempting to change the first record, wherein the notification is sent to the parent record in the first data structure before the change request is allowed to change the value stored in the first record.

20. A method of representing records in a plurality of hierarchical data structures, the method comprising:

maintaining, by a computer system, a first data structure comprising a plurality of records, the plurality of records being organized in a first hierarchy of parent-child relationships in the first data structure;

maintaining, by the computer system, a second data structure comprising the plurality of records, the plurality of records being organized in a second hierarchy of parent-child relationships in the second data structure;

receiving, by the computer system, a change request for the value stored in a first record in the plurality of records, the change request being received from a parent record in the second data structure of the first record; and sending, by the computer system, a notification to a parent record of the first record in the first data structure that the parent record in the second data structure is attempting to change the first record, wherein the notification is sent to the parent record in the first data structure before the change request is allowed to change the value stored in the first record.

* * * * *

UNITED STATES PATENT AND TRADEMARK OFFICE
CERTIFICATE OF CORRECTION

| | | |
|---|---|---|
| PATENT NO. | : 11,650,973 B2 | Page 1 of 1 |
| APPLICATION NO. | : 16/889069 | |
| DATED | : May 16, 2023 | |
| INVENTOR(S) | : Upadhyaya et al. | |

It is certified that error appears in the above-identified patent and that said Letters Patent is hereby corrected as shown below:

On the Title Page

On page 2, Column 2, under Item (56) Other Publications, Line 18, delete "Wollongon," and insert -- Wollongong, --, therefor.

In the Drawings

On sheet 7 of 14, in FIG. 7, Line 10, delete "Deafult" and insert -- Default --, therefor.

On sheet 7 of 14, in FIG. 7, Line 19, delete "Deafult" and insert -- Default --, therefor.

On sheet 8 of 14, in FIG. 8, Line 11, delete "Deafult" and insert -- Default --, therefor.

In the Specification

In Column 23, Line 56, delete "evolution)," and insert -- evolution)), --, therefor.

Signed and Sealed this
Twentieth Day of February, 2024

Katherine Kelly Vidal
*Director of the United States Patent and Trademark Office*